(12) United States Patent
Shearer

(10) Patent No.: US 11,321,315 B2
(45) Date of Patent: May 3, 2022

(54) METHODS AND SYSTEMS FOR DATABASE OPTIMIZATION

(71) Applicant: WISETECH GLOBAL LIMITED, Alexandria (AU)

(72) Inventor: Brett Anthony Shearer, Alexandria (AU)

(73) Assignee: WiseTech Global Limited, Alexandria (AU)

( * ) Notice: Subject to any disclaimer, the term of this patent is extended or adjusted under 35 U.S.C. 154(b) by 783 days.

(21) Appl. No.: 16/090,512

(22) PCT Filed: Mar. 24, 2017

(86) PCT No.: PCT/AU2017/050265
§ 371 (c)(1),
(2) Date: Oct. 1, 2018

(87) PCT Pub. No.: WO2017/165914
PCT Pub. Date: Oct. 5, 2017

(65) Prior Publication Data
US 2019/0114294 A1    Apr. 18, 2019

(30) Foreign Application Priority Data

Mar. 31, 2016  (AU) .............................. 2016901204
May 5, 2016    (AU) .............................. 2016202911

(51) Int. Cl.
*G06F 16/2453* (2019.01)
*G06F 16/28* (2019.01)
(Continued)

(52) U.S. Cl.
CPC ............ *G06F 16/24542* (2019.01); *G06F 16/24564* (2019.01); *G06F 16/252* (2019.01); *G06F 16/284* (2019.01)

(58) Field of Classification Search
None
See application file for complete search history.

(56) References Cited

U.S. PATENT DOCUMENTS 6,466,931 B1 * 10/2002 Attaluri ............ G06F 16/24524
6,549,910 B1 *  4/2003 Tate ................... G06F 16/2462
(Continued)

OTHER PUBLICATIONS

Shane Lively & Michael Sarsany, "SQL Server Standards Version 1.5," Apr. 14, 2010 (Year: 2010).*
(Continued)

*Primary Examiner* — Yu Zhao
(74) *Attorney, Agent, or Firm* — Fenwick & West LLP

(57) ABSTRACT

This disclosure relates to increasing performance of database queries. A proxy server receives an input query string and a parameter value for first parameter name in the query string. The proxy server determines a second parameter name based on the parameter value and different to the first parameter name. The proxy server then determines an output query string based on the input query string. The output query string comprises a filter clause with a field name and a second field value, the second field value of the output query string being based on the second parameter name. The proxy server finally sends the output query string to a database management system to cause the database management system to execute a database query using an execution plan based on the second parameter name in the output query string.

17 Claims, 10 Drawing Sheets

```
900
              907      910      909
      <fieldnames> <table names>  <fieldname> <operator> <firstparametername>
901 ~ receive:    SELECT * FROM Customers WHERE Country = @country_param  908
                                                                            906
902 ~ receive:    "Mexico" (parameter value for @<firstparametername>)

903 ~ determine:  country_param_mex (<secondparametername>)
                                                        907
904 ~ determine:  SELECT * FROM Customers WHERE Country = @country_param_mex  912
                                                                                911
905 ~ send to DB: SELECT * FROM Customers WHERE Country = @country_param_mex
```

(51) Int. Cl.
    *G06F 16/2455* (2019.01)
    *G06F 16/25* (2019.01)
    *G06F 16/242* (2019.01)

(56) References Cited

U.S. PATENT DOCUMENTS

| | | | |
|---|---|---|---|
| 7,031,958 | B2 | 4/2006 | Santosuosso |
| 7,062,502 | B1* | 6/2006 | Kesler .................. G06F 16/252 |
| 8,533,181 | B2 | 9/2013 | Hu et al. |
| 8,548,985 | B2 | 10/2013 | Dettinger et al. |
| 9,009,140 | B2 | 4/2015 | Chen et al. |
| 2003/0212863 | A1* | 11/2003 | Ganguly ........... G06F 16/24539 711/118 |
| 2004/0158557 | A1* | 8/2004 | Welcker ................. G06Q 10/10 |
| 2004/0220908 | A1 | 11/2004 | Finlay et al. |
| 2006/0074874 | A1 | 4/2006 | Day et al. |
| 2008/0065589 | A1* | 3/2008 | Birka .................. G06F 16/2454 |
| 2009/0106746 | A1* | 4/2009 | Chaudhuri ................ G06F 8/20 717/158 |
| 2011/0029508 | A1 | 2/2011 | Al-omari et al. |
| 2012/0330988 | A1* | 12/2012 | Christie ................ G06F 16/951 707/759 |
| 2013/0318069 | A1 | 11/2013 | AluÇ et al. |
| 2014/0046928 | A1 | 2/2014 | Konik et al. |
| 2015/0032723 | A1* | 1/2015 | Khanolkar ........ G06F 16/24524 707/718 |
| 2017/0161323 | A1* | 6/2017 | Simitsis ................ G06F 16/248 |

OTHER PUBLICATIONS

Tutorialspoint, "Learn Hive hive query language," Jan. 8, 2015 (Year: 2015).*
PCT International Search Report and Written Opinion, PCT/AU2017/050265, dated Jun. 1, 2017, 11 Pages.
European Patent Office, Extended European Search Report and Opinion, EP Patent Application No. 17772872.2, dated Oct. 31, 2019, eight pages.

* cited by examiner

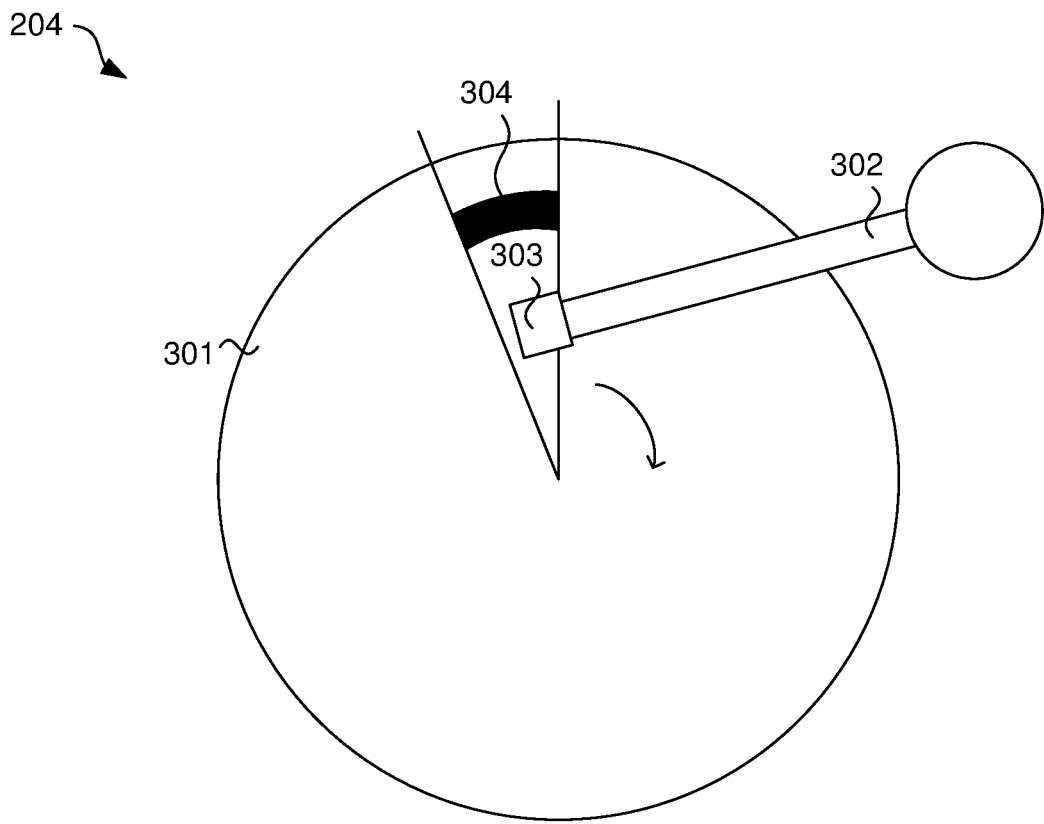

Fig. 3

| Product | Origin | Destination | Location |
|---|---|---|---|
| Choral Music of Irving Fine | Denver | Berlin | NULL |
| Eiffel Tower Centerpiece | New York | San Diego | NULL |
| Funny Birthday Card | New York | Munich | Los Angeles |
| LED Candles w/Remote | London | Prague | London |
| Leather Dog Lead | Rome | Johannesburg | Dubai |
| Thriller Mystery Boxed Set | New York | Sydney | Los Angeles |
| Zoya Surf Collection Lacquer | London | Santiago | Los Angeles |

| ID | Product | Origin | Destination | Location |
|---|---|---|---|---|
| 1 | Thriller Mystery Boxed Set | 8 | 13 | 6 |
| 2 | Funny Birthday Card | 8 | 7 | 6 |
| 3 | Choral Music of Irving Fine | 2 | 1 | NULL |
| 4 | LED Candles w/Remote | 5 | 9 | 5 |
| 5 | Leather Dog Lead | 10 | 4 | 3 |
| 6 | Zoya Surf Collection Lacquer | 5 | 11 | 6 |
| 7 | Eiffel Tower Centerpiece | 8 | 12 | NULL |

610

| ID | City name |
|---|---|
| 1 | Berlin |
| 2 | Denver |
| 3 | Dubai |
| 4 | Johannesburg |
| 5 | London |
| 6 | Los Angeles |
| 7 | Munich |
| 8 | New York |
| 9 | Prague |
| 10 | Rome |
| 11 | Santiago |
| 12 | San Diego |
| 13 | Sydney |

METHODS AND SYSTEMS FOR DATABASE OPTIMIZATION

CROSS-REFERENCE TO RELATED APPLICATIONS

The present application claims priority from Australian provisional application 2016901204 filed on 31 Mar. 2016 the content of which is incorporated herein by reference.

The present application also claims priority from Australian complete application 2016202911 filed on 5 May 2016 the content of which is incorporated herein by reference.

TECHNICAL FIELD

This disclosure relates to methods and systems that increase performance of database queries.

BACKGROUND

For most companies it is important to manage data in some shape or form. For example, a freight company keeps track of shipments, such as their origin, their destination and their current location and their custom status. In the logistics industry, data generated daily is massive.

FIG. 1 illustrates a pen 101 and paper 102 approach where a logistics manager manually keeps a written record in the form of a table on the different products. The paper 102 comprises a plurality of columns including a product column 103, an origin column 104, a destination column 105 and a location column 106. The logistics manager can fill-in the city names as appropriate and update city names in the current location column 106 as the product is shipped from the origin to the destination.

The pen and paper approach quickly arrives at practical limitations as soon as data changes quickly and a large number of products needs to be monitored. A solution to achieve more efficient and effective data management is to move to computerised systems.

FIG. 2 illustrates a computerised data management system 200 comprising a display 201, an input device 202, such as a keyboard, a processor 203 and a hard disk 204. Hard disk 204 stores a text file 205. Text file 205 contains human readable characters arranged in lines, such that there is one line per product as show in FIG. 2. The columns are separated by a semicolon. The table structure is essentially the same as in FIG. 1 but stored on computer memory instead of on paper.

The computerisation allows the use of program code to store and access the data. In particular, a developer can create program code to access data that queries the data in file 205 to return a number of lines that meet a certain criterion. For example, the program code can count how many products are currently in "Los Angeles" by iterating over all lines, splitting each line by the semicolon and incrementing a counter if the fourth split element is "Los Angeles". For example:

line=getline(datafile);
if (line.split(";")[3]=="Los Angeles") {count++};

While the solution based on text file 205 provides significant advantages over using paper 102, there are also limitations that are partly rooted in how the processor 203 stores and accesses file 205. Additionally, when data received daily is massive, tens and sometimes hundreds of tables are required, often referencing each other. Storage and search strategies are important to optimise CPU time in the process.

FIG. 3 illustrates the hard disk 204 in more detail. In particular, hard disk 204 comprises a rotating disk 301 and arm 302 carrying a reading and writing head 303. Head 303 writes data into sectors, such as example sector 304 on rotating disk 301. The size of sector 304 is fixed by the disk manufacturer and may be 512 bytes or 4 kilobytes. This means the amount of space on the rotating disk 301 occupied by data file 205 is a multiple of the sector size and multiple files do not share one sector. As data file 205 grows, it may not fit into one sector and the disk manager allocates a second sector to the data file 205. The second sector may not be directly adjacent the first sector 304, which is referred to as fragmentation. As a result, when reading the entire file, arm 302 moves reading head 303 between the different sectors allocated to data file 205. Since this operation involves mechanical movement and the speed of arm 302 is limited, the reading of the entire file can slow down significantly. This is a particular problem when reading the entire file 205 such as when counting all products that are currently in Los Angeles. This problem is further exacerbated in cases where multiple users query the same file 205 at the same time and reading head 303 moves more frequently between sectors. In this way, response time can be affected.

A further disadvantage of using files to store data is that the program for querying the data is complex and error prone. In particular, it is difficult to create complex queries on combinations of data files that provide reliable results and do not waste CPU time.

To address these issues of complexity and limitation on functionality, database management systems (DBMS) can be used. For example, SQL databases, such as Oracle's database as a service (DAaaS), MySQL and Microsoft SQL server can be used to store and access massive data. In the terminology of databases each row of data file 205 may be referred to as a record and all records of data file 205 are referred to as a table. Columns 'Product', 'Origin', 'Destination' and 'Location' are referred to as fields. However, the terms rows and columns can equally be used for databases. Databases usually host many different tables, which often refer to one another.

The DBMS separates the rows from data in file 205 into pieces or sub-sets with a size of 8 KB each. The storage space where each of these sub-sets is stored on disk 301 is referred to as page. Eight pages together constitute an extent. This means that a sector of 512 KB holds 64 pages in 8 extents and the 8 extents are typically stored as contiguous data in the sector in order to reduce the movement of arm 302 to reduce delays. When the DBMS reads a row from a page, the DBMS loads the entire page into a cache on volatile memory, such as RAM. Further queries for rows in the same page can then use the cached version. Since RAM does not have a moving arm 302 or other mechanical components but addresses the data directly through bit lines and address lines, the use of RAM cache decreases access times significantly.

When processor 203 creates a new row, the DBMS may store the row at the end of the last page. That is, the DBMS does not change the order of the data on the disk 301 depending on the data. Since this results in a table without order, it is referred to as a heap as shown in FIG. 2. In a heap, most queries access every row and therefore, retrieve the entire table from the hard disk 204. Accessing every row expends substantial system time.

FIG. 4 illustrates an ordered table 400, which is also referred to as a clustered index which are used instead of a heap for example, when the table is large, when ranges of data are frequently queried from the table and when data is frequently returned in a sorted order. It is noted that the order in which the rows are shown in FIG. 4 also represents the order in which the rows are stored on disk 301. A query on the product name, such as all rows starting with 'L', can be performed without retrieving all rows from the disk 301. Processor 203 can retrieve the row in the middle or approximately in the middle and determine whether that row starts with a letter that is before or after 'L' in the alphabet. If the row starts with 'T', for example, processor 203 further considers only the first half of the row set. Processor 203 retrieves the row in middle of the first half and checks whether the starting letter is before or after 'L' in the alphabet and so on. Especially for large tables, this quickly reduces the search space and significantly increases the performance. Further, once processor 203 finds one row starting with 'L', any other rows starting with 'L' are directly adjacent the first located row. This way, processor 203 does not retrieve further rows other than those that are directly adjacent. It is noted that this is a simplified explanation and practical databases use more complicated data structures, such as B-trees. However, the same concept applies with the only difference that the leaves of the tree represent the rows and processor 203 can find rows in the index by disregarding entire sub-trees below those nodes that do not match the criteria.

FIG. 5a illustrates another example for a clustered index, which is generated using an 'ID' column 501. This makes it particularly efficient to retrieve rows given a particular ID. Referring back to FIG. 4, it is noted that a table only has one clustered index since the table can only be sorted one way at one time. Therefore, the clustered index 400 in FIG. 400 allows efficient searching for the product field but not for the other fields. To solve this, the DBMS may create an non-clustered index.

FIG. 5b illustrates an non-clustered index 510, which is stored as additional data on disk 301. As opposed to a clustered index, a non-clustered index is a special type of index in which the logical order of the index does not match the physical sorted order of the rows on the disk. The non-clustered index 510 basically is a table comprising one field 511, the 'Origin' field in this example, and a reference 512, the 'ID' in this case, to the original table in FIG. 5a. The non-clustered index 510 is sorted by origin 511. Processor 203 can now apply the same search strategy (i.e. execution plan) as described above to count all products originating from New York, for example. If the total count is the only requested output, processor 203 does not retrieve any data from disk 301 other than non-clustered index 510, which will likely fit onto one page. As a result, the query is extremely fast. If further data from matching rows is requested, processor 203 can retrieve the rows as indicated by the ID field 512, that is, rows '1', '2' and '6', for the New York example. It is possible to create multiple non-clustered indices for multiple respective columns/fields to increase speed at the cost of additional storage used for storing the index data as shown in FIG. 5b.

FIGS. 6a and 6b illustrate an example of a first table 600 in FIG. 6a and a second table 610 in FIG. 6b, the second table 610 referenced by the first table 600. Here, the city names in first table 600 are replaced by identifiers that point to the second table 610. This has the advantage that if the name of one city is changed, only one entry in second table 610 is changed to reflect that change. Further, the storage is more space efficient as the strings for each city are stored only a single time. The splitting into multiple tables follows the design concept of Normal Form Databases. The city identifiers in first table 600 are referred to as foreign keys as they point to entries in a different table, that is, second table 610. In order to perform a query to count all products that are currently in Los Angeles, for example, processor 203 joins the first table 600 with the second table 610 using the city identifiers as cross-references.

Referring back to FIG. 5a for simplicity of explanation, querying the database by retrieving all rows as described with reference to the heap structure in FIG. 2 is referred to as a "table scan". In contrast, querying the database using the index as described with reference to FIGS. 4, 5a and 5b is referred to as an "index seek". Generally, an index seek executes faster than a table scan because processor 203 does not retrieve the entire table. However, in cases where the majority of rows match the search criteria, processor 203 retrieves this majority of rows anyway, which means the table scan is actually the more efficient operation. Especially when keeping in mind that entire pages are retrieved which makes it likely that processor 203 retrieves the entire table if 50% of the rows match the criteria, for example.

The different performance between scan and seek illustrates that processor 203 can make a decision between these two options to optimise performance. It is noted that the above examples are simplified and the number of options is generally far greater than two. Especially in cases where multiple tables are combined as shown in FIGS. 6a and 6b, the number of options may grow exponentially. The combination of different options for different aspects of the query to achieve the desired result is referred to as an execution plan as mentioned above. It is not uncommon for databases to have 600 or more tables with millions of entries and millions of queries per week.

Processor 203 selects one of multiple execution plans that has the smallest estimated cost in terms of execution time and storage requirements. Selecting the optimal execution plan can be computationally expensive as many different options and combinations are evaluated. For that reason, processor 203 aims to avoid the creation of new execution plans as much as possible. As mentioned, processor 203 stores a generated execution plan in a plan cache such that subsequent queries can re-use the execution plan. This creates the problem of deciding between a stored execution plan to avoid the delay for optimisation and creating a new execution plan that is optimal for the particular query. Another constraint is that the uncontrolled generation of execution plans leads to 'plan bloat', which refers to a large number of plans that occupy a considerable amount of the database RAM cache, which can therefore not be used for caching database rows. One solution of the plan bloat problem is to perform a scheduled plan flush, which deletes all plans from the cache. Since the re-creation of the plans typically uses a large amount of computing power, plan flushes are often impractical and may lead to increased response times during re-creation.

In cases where the query contains a parameter, such as SELECT*FROM products WHERE origin=@origin_param, the DBMS generally creates one execution plan and then re-uses the same execution plan each time the same query is performed for different values of the parameter @origin_param. This often leads to sub-optimal results for large databases where the frequency of the different values for @ origin_param differ significantly from each other. This problem becomes particularly serious for databases with close to 1,000 cross-referenced tables, with millions of entries in each table and millions of queries per week.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Again, referring to FIG. 2, processor 203 preferably selects one of multiple execution plans that has the smallest estimated cost in terms of execution time and storage requirements. However, selecting the optimal execution plan can be computationally expensive as many different options and combinations are evaluated. This creates the problem of deciding between a stored execution plan to avoid the delay for optimisation and creating a new execution plan that is optimal for the particular query. However, an SQL server will evict plans from the plan cache that are not frequently used. A result is new plans are frequently generated with a CPU usage cost.

Another constraint is that the uncontrolled generation of execution plans leads to 'plan bloat', which refers to a large number of plans that occupy a considerable amount of the database RAM cache, which can therefore not be used for caching database records. One solution of the plan bloat problem is to perform a scheduled plan flush, which deletes all plans from the cache. Since the re-creation of the plans typically uses a large amount of computing power, plan flushes are often impractical and may lead to increased response times during re-creation. The re-creation of a large number of plans is referred to as a "plan storm". In a situation, for example, like real time trading, a few minutes to recover from a plan storm can be devastating.

While SQL server does re-use plans, for example, in cases where the query contains a parameter, such as SELECT*IN products WHERE origin=@origin_param, the DBMS generally creates one execution plan and then re-uses the same execution plan each time the same query is performed for different values of the parameter @origin_param. This approach often leads to sub-optimal results for large databases where the frequency of the different values for @origin_param differ significantly from each other. For example, when a search is performed for criteria that represents a substantial portion of the table, a plan such as Table Scan will be used. If the first search performed is for US, then subsequent requests (such as FJ—fiji) would result in table scans even though they are not optimal. Conversely, if the first search is FJ—an index seek would be performed. Then futures searches (such as US) would result in very inefficient index seeks for large amounts of data. This problem becomes particularly serious for databases with close to 1,000 cross-referenced tables, with millions of entries in each table and millions of queries per week.

To avoid wasteful plan bloats, potentially devastating plan storms, and to hence save system resources, disclosed are methods and systems for altering a query so that it generates a plan in which the statistics of the data stored are considered. The disclosed methods and system for altering a query result in a plan being generated so that instead of searching the entire date database, the plan results in searching for the requested limited location. In this way a generated plan is generated based upon what is statistically determined to be stored and what is actually being requested, prior the query being presented to the SQL server (in a proxy system between the query and the server). By changing the parameters to something useful, like in this case, to a limited location, the plan will be re-used since it is likely that a limited location will be used repeatedly.

Definitions

A database is an organized collection of data. It is the collection of schemas, tables, queries, views and other objects. The database is managed by a database management system (DBMS), which is a computer software application that interacts with the user, other applications, and the database itself to capture and analyse data.

A table is a collection of related data held in a structured format within a database. It consists of fields (columns), and rows. In relational databases and flat file databases, a table is a set of data elements (values) using a model of vertical columns (identifiable by column name or field name) and horizontal rows, the cell being the unit where a row and column intersect. A table has a specified number of columns, but can have any number of rows. Each row is identified by one or more values appearing in a particular column subset. The columns subset which uniquely identifies a row is called the primary key. In many applications, the database holds many tables and a first table can contain a reference to a row in a second table. Such a reference is often the primary key of the second table and is then referred to as a foreign key. For example, the cells in the Origin column contain an integer as a reference to a separate table of city names instead of a string of the city name itself. Using separate tables and foreign keys allows the creating of a database that accords with Normal Form, which is a set of rules that ensure the database remains well structured. A join is an operation that combines a main table with two or more other tables, such that the foreign keys in the main table can be queries as if they were replaced by the values in the other tables to which the foreign key refers.

A query is the execution of a command on the database. A query may be the execution of a command to retrieve data from the database. Retrieving data from the database may also be referred to as selecting data from the database, such as by executing a SELECT command. The query is typically formulated as a query string or statement, which adheres to a query language syntax. A useful reference of an example syntax, the SQL syntax, can be found at http://www.w3schools.com/sql/. An example query string is "SELECT*FROM Customers" to retrieve all rows from the Customers table.

A variable is an object or data item that may take on more than one value during the execution of the command. Each variable has a variable name that can be used in the command to refer to that variable, such as to declare, set or read the variable. In the example of SQL a variable is referred to as @variable name, where "variable name" is the name of the variable.

A parameter is similar to a variable and both terms may be used interchangeably. In some contexts, a parameter refers to an object used to pass data between a query and the script that executes or generates the query while a variable refers to an object used to pass data between different statements in a single query. It is often best practice to choose names that reflect whether the object is a parameter or a variable, such as by adding a 'param' or 'Afar' suffix to the object name. The script that executes or generates the query and provides the parameter value may be part of a logistics software program that generates a user interface to display selected data from the database or to generate weekly reports, for example.

A filter clause is a part of the query that defines a filter such that the database server only returns those rows that satisfy the filter clause. In the example of SQL, the filter clause starts with 'WHERE', such that a query may be "SELECT*FROM Customers WHERE Country='Mexico'". In this example, 'Customers' is the table name, 'Country' is the field name and 'Mexico' is the field value of the filter clause. The expression "Country='Mexico'" is referred to as a field name-value pair. The field value may be a variable or parameter, such as in "Country=@countryparam". This expression containing the parameter name 'countryparam' is also referred to as a field name-value pair. Typically, the field name-value pair also comprises an operator, such as '=', to link the field name to the field value. Other operators, such as '< >', '>', '<', '>=', '<=', 'BETWEEN', 'LIKE' and 'IN' are equally possible. Literalisation means the replacement of the parameter name by the parameter value. For example, literalisation replaces "@countryparam" with "Mexico". In this sense, literalisation also determines a second parameter name based on the parameter value.

An index is a data structure that improves the speed of data retrieval operations on a database table at the cost of additional writes and storage space to maintain the index data structure. Indexes are used to quickly locate data without having to search every row in a database table every time a database table is accessed. In particular, indexes address the problem of slow access to the actual data on a hard disk drive (HDD). The DBMS stores new rows on the HDD after the last row and without an index, the DBMS would need to retrieve all rows of the queried table from the HDD, which would result in a large number of HDD accesses with the associated long access time. This retrieval of the full table for the query is referred to as a full table scan or simply scan. With an index, the DBMS can query the index and the index would provide a reference to the matching data, which is referred to as a seek. The index generally takes up significantly less space on the HDD and therefore, retrieving the complete index to search it is significantly faster than retrieving all rows. When a clustered index is used, the DBMS changes the physical location of where the rows are stored on the HDD to reflect the index structure. While this leads to further performance improvements, only a single clustered index can be used per table. When an non-clustered index is used, the location of the rows remains unchanged and multiple non-clustered indexes can be used per table. In general, seeking is faster than scanning but requires additional storage space for the index and additional processor time to maintain the index.

A filtered index is an index that is created on a subset of rows in the database. In other words, when the index is created a selection criteria is provided similar to the WHERE clause above, such that only rows satisfying the WHERE clause are included in the index. The selection criteria is also referred to as a filter predicate.

A query plan (or query execution plan or execution plan) is an ordered set of steps used to access the rows in the database. The DBMS uses a query plan to execute a query. Most queries may be performed by many different query plans. For example, an index seek and a full table scan retrieve the same results. During query plan generation, the DBMS estimates which steps would lead to an optimal execution of the query. For example, the DBMS estimates whether an index seek or a full table scan would result in a faster retrieval of the required rows. Since the creation and optimisation of query plans is computationally expensive, the DBMS may store created query plans in a plan cache. When a similar query is to be executed, the DBMS checks the plan cache and re-use one of the existing plans to speed up the query by avoiding a re-creation of the query plan. When variables are used in the query, the plan for queries with different parameter values may be the same as long as the parameter name is unchanged. For example, the DBMS creates an execution plan when receiving the query "SELECT*FROM Customers WHERE Country=@countryparam". The DBMS then uses this execution plan every time the same query is to be executed for different values of the @countryparam parameter. In other words, the DBMS uses the same execution plan for queries for 'Mexico' and for 'Canada' as values of @countryparam.

A histogram measures the frequency of occurrence for each distinct value in a data set. The DBMS may select the column values by statistically sampling the rows or by performing a full scan of all rows in the table. If the histogram is created from a sampled set of rows, the stored totals for number of rows and number of distinct values are estimates and may not be whole integers. To create the histogram, the DBMS may sort the column values, compute the number of values that match each distinct column value and then aggregates the column values into a maximum of 200 contiguous histogram steps, for example. Each step includes a range of column values followed by an upper bound column value. The range includes all possible column values between boundary values, excluding the boundary values themselves. The lowest of the sorted column values is the upper boundary value for the first histogram step. A histogram is stored as histogram data, which may comprise lines of text where each line includes an upper bound column value and numerical values for the number of rows in the range, number of equal rows, number of distinct range rows and an average of range rows.

A method for querying a database comprises:
  receiving an input query string, the input query string comprising a filter clause with a field name and a first field value, the first field value being indicative of a first parameter name;
  receiving a parameter value for the first parameter name;
  determining a second parameter name based on the parameter value and different to the first parameter name;
  determining an output query string based on the input query string, the output query string comprising the filter clause with the field name and a second field value, the second field value of the output query string being based on the second parameter name; and
  sending the output query string to a database management system to cause the database management system to execute a database query using an execution plan based on the second parameter name in the output query string.

Since the database management system uses an execution plan based on the second parameter name in the output query string, the generation of execution plans can be influenced by the second parameter name. As a result, determining the second parameter name can optimise the generation and caching of execution plans in the DBMS without changing the DBMS itself. This adds control to the operation of the DBMS.

Determining the output query string may comprise replacing the first parameter name in the input query string by the determined second parameter name.

The second parameter name may comprise the first parameter name and a suffix or prefix and determining the second parameter name may comprise determining the suffix or prefix.

The second parameter name may be a suffix or prefix to the first parameter name and determining the second parameter name may comprise determining the suffix or prefix.

The field name may refer to a foreign key and determining the second parameter name may comprise determining the second parameter name based on a number of rows in a table associated with the foreign key.

The method may further comprise upon determining that the number of rows in the table associated with the foreign key is below a threshold, determining the second parameter name such that the second parameter name is unique for each row in the table associated with the foreign key.

The parameter value for the first parameter name may comprise a string and determining the second parameter name such that the second parameter name is unique for each row in the table associated with the foreign key may comprise appending a suffix to the first parameter name based on the parameter value for the first parameter name.

The suffix may comprise the first two or more letters of the parameter value.

The method may further comprise receiving histogram data for the field name and determining the second parameter name may comprise determining the second parameter name based on the histogram data.

Determining the second parameter name based on the histogram data may comprise determining the second parameter name such that the second parameter name is unique for each histogram step.

Determining the second parameter name based on the histogram data may comprise determining the second parameter name based on multiple predefined conditions on the histogram steps, such that for each predefined condition the second parameter name is identical for all parameter values in histogram steps that satisfy that condition.

Determining the second parameter name may comprise using a predefined parameter name as the second parameter name upon determining that the parameter value is in a histogram step that has a frequency value below a predetermined threshold.

It is an advantage to assign the same parameter name to all queries for values with low frequency since an execution plan for one query for low frequency will likely also be suitable for another query for low frequency.

The parameter value may be related to a date and/or time, the method may further comprise determining a length of a time period based on the date and/or time and determining the second parameter name may comprise determining the second parameter name based on the length of the period of time.

Determining the second parameter name may comprise determining the second parameter name based on multiple predefined conditions on the length of the period of time, such that for each predefined condition the second parameter name is identical for all parameter values with a length of the period of time that satisfy that condition.

Determining the second parameter name may comprise determining whether the field name relates to a filtered index and upon determining that the field name relates to a filtered index, using the parameter value as the second parameter name.

Using the parameter value as the second parameter name is referred to as literalisation.

A computer system for querying a database comprises:
an input port
  to receive an input query string, the input query string comprising a filter clause with a field name and a first field value, the first field value being indicative of a first parameter name, and
  to receive a parameter value for the first parameter name;
a processor
  to determine a second parameter name based on the parameter value and different to the first parameter name,
  to determine an output query string based on the input query string, the output query string comprising the filter clause with the field name and a second field value, the second field value of the output query string being based on the second parameter name; and
an output port to send the output query string to a database management system to cause the database management system to execute a database query using an execution plan based on the second parameter name in the output query string.

A database proxy system comprises:
an input connected to a client computer to receive from the client computer an input query string, the input query string comprising a filter clause with a field name and a first field value, the first field value being indicative of a first parameter name, and
  to receive a parameter value for the first parameter name;
a processor
  to determine a second parameter name based on the parameter value and different to the first parameter name,
  to determine an output query string based on the input query string, the output query string comprising the filter clause with the field name and a second field value, the second field value of the output query string being based on the second parameter name; and
an output port connected to a database management system to send the output query string to a database management system to cause the database management system to execute a database query using an execution plan based on the second parameter name in the output query string.

A database management system comprises:
an input connected to receive an input query string, the input query string comprising a filter clause with a field name and a first field value, the first field value being indicative of a first parameter name, and
  to receive a parameter value for the first parameter name;
a processor
  to determine a second parameter name based on the parameter value and different to the first parameter name,
  to determine an output query string based on the input query string, the output query string comprising the filter clause with the field name and a second field value, the second field value of the output query string being based on the second parameter name; and a database engine to execute a database query using an execution plan based on the second parameter name in the output query string.

A method for querying a database comprises:

receiving an input query string of the form SELECT <fieldnames> FROM <table names> WHERE <fieldname> <operator>@<firstparametername>;

receiving a parameter value for @dirstparametername>;

determining <secondparametername> based on the parameter value and different to <firstparametername>;

determining an output query string of the form SELECT <fieldnames> FROM <table names> WHERE <dieldname> <operator>@<secondparametername>; and sending the output query string to a database management system to cause the database management system to execute a database query using an execution plan based on the second parameter name in the output query string where terms within < > brackets are replaced by terms used in the actual implementation and immutable during the performance of the method.

Optional features described of any aspect of method, computer readable medium or computer system, where appropriate, similarly apply to the other aspects also described here.

BRIEF DESCRIPTION OF DRAWINGS

FIG. 3 illustrates a hard disk used in the computerised data management system of FIG. 2.

FIG. 4 illustrates an ordered table, which is also referred to as a clustered index.

Figure 7:
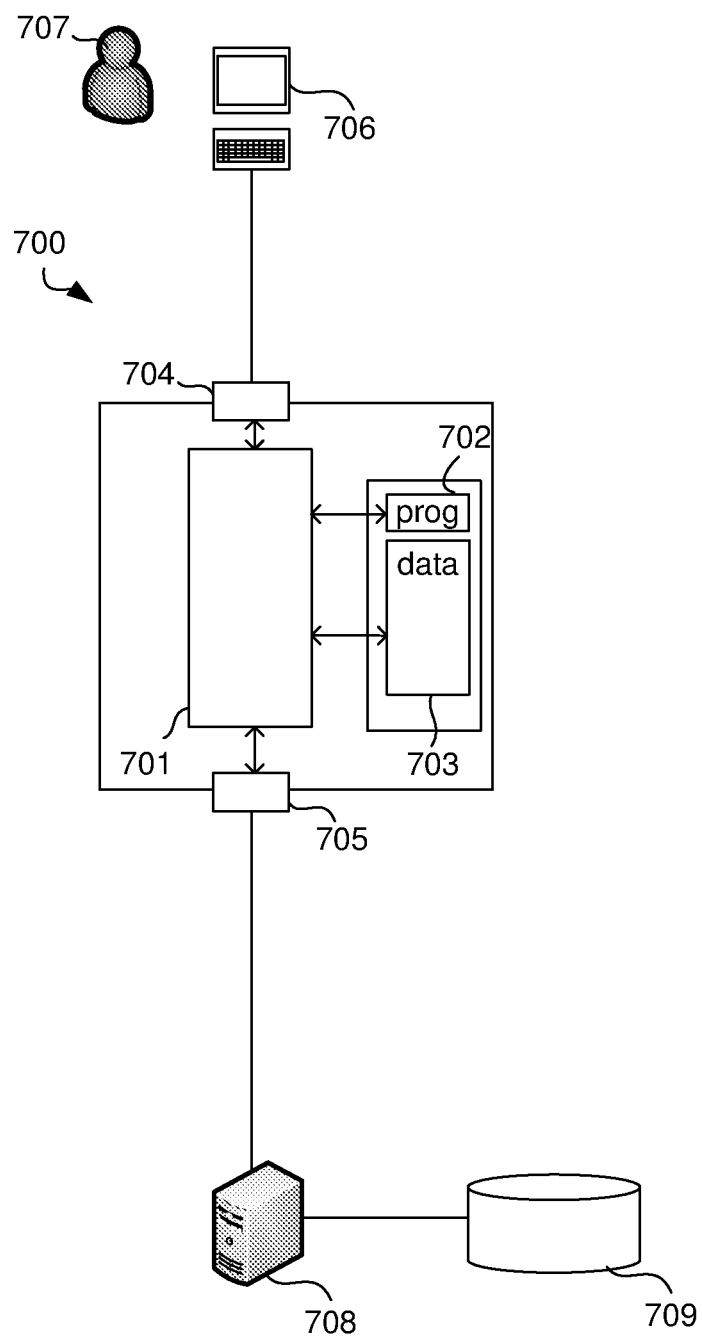

An example will be described with reference to:

FIG. 7 illustrates a computer system for querying a database.

Figure 8:
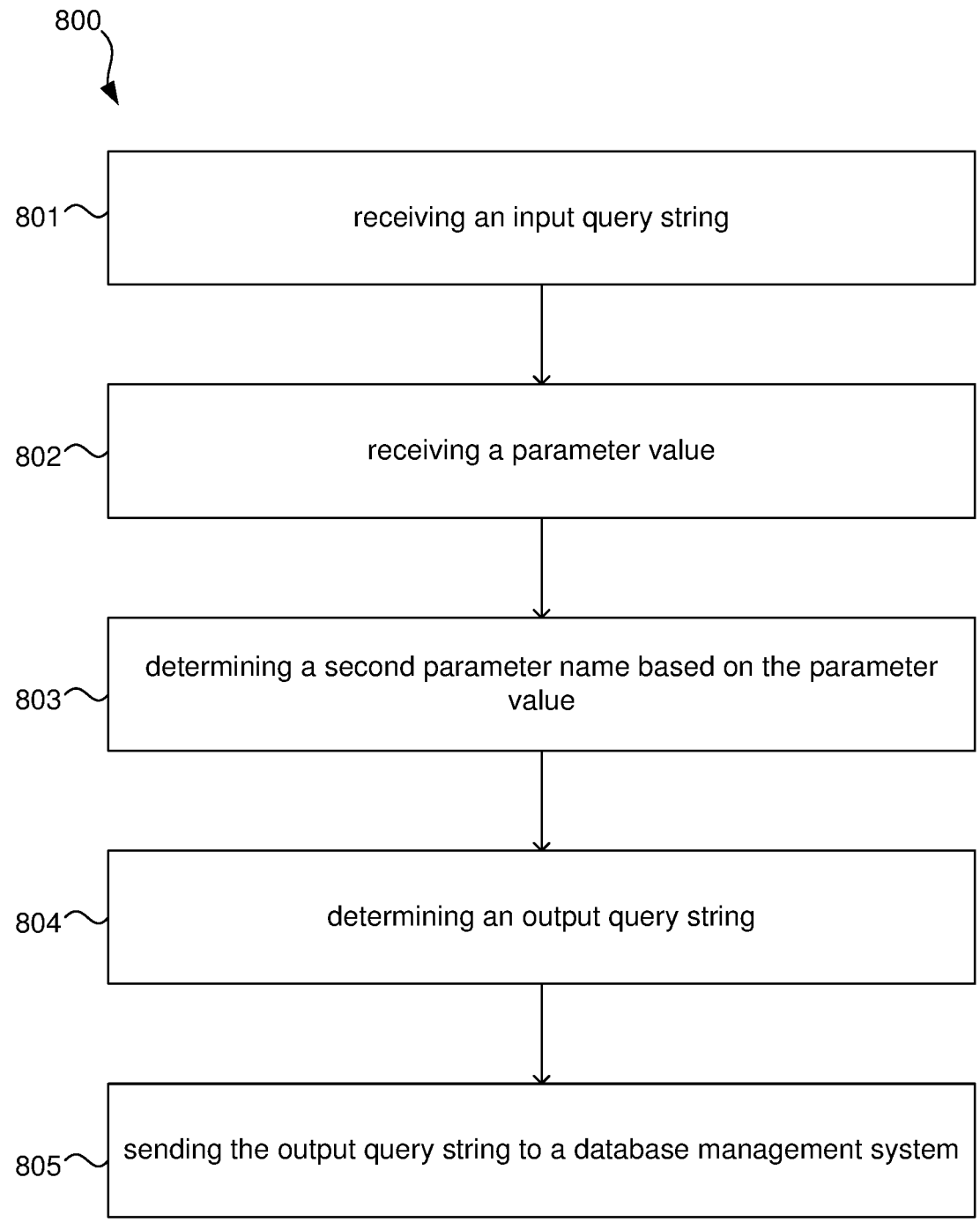

FIG. 8 illustrates a method for querying a database.

Figure 9:
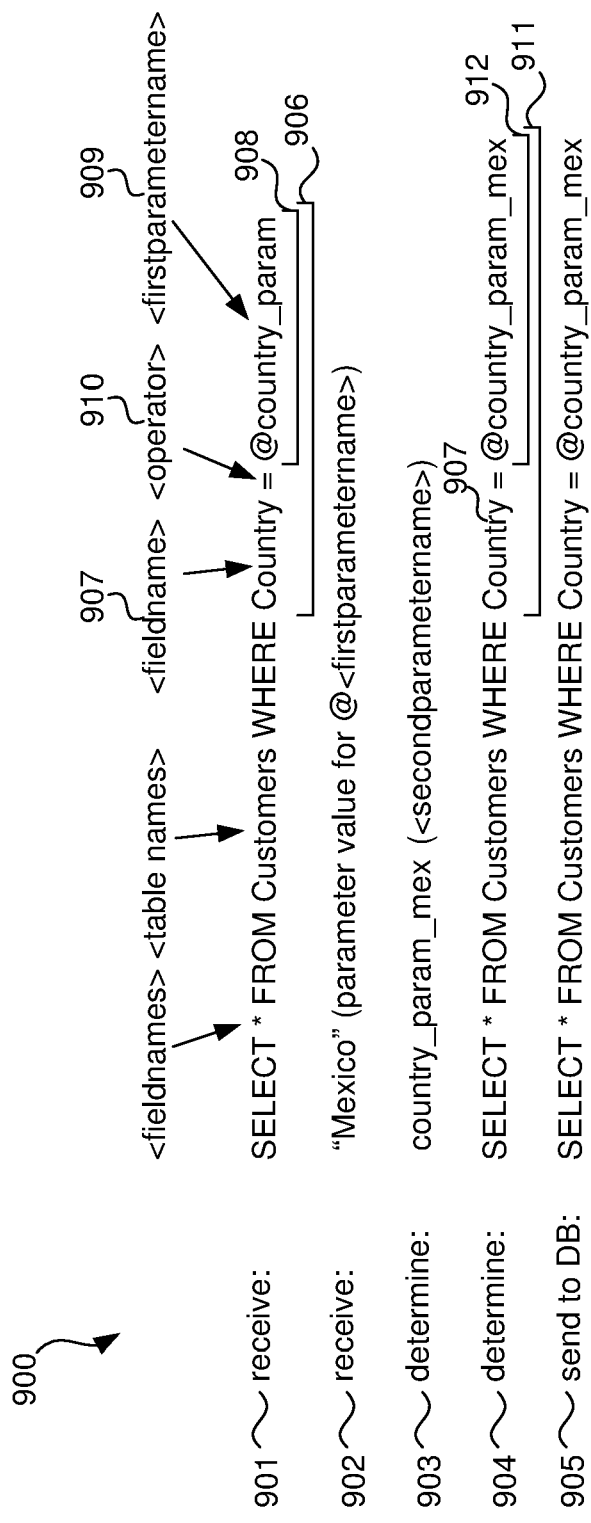

FIG. 9 illustrates example data of the method in FIG. 8.

Figure 10:
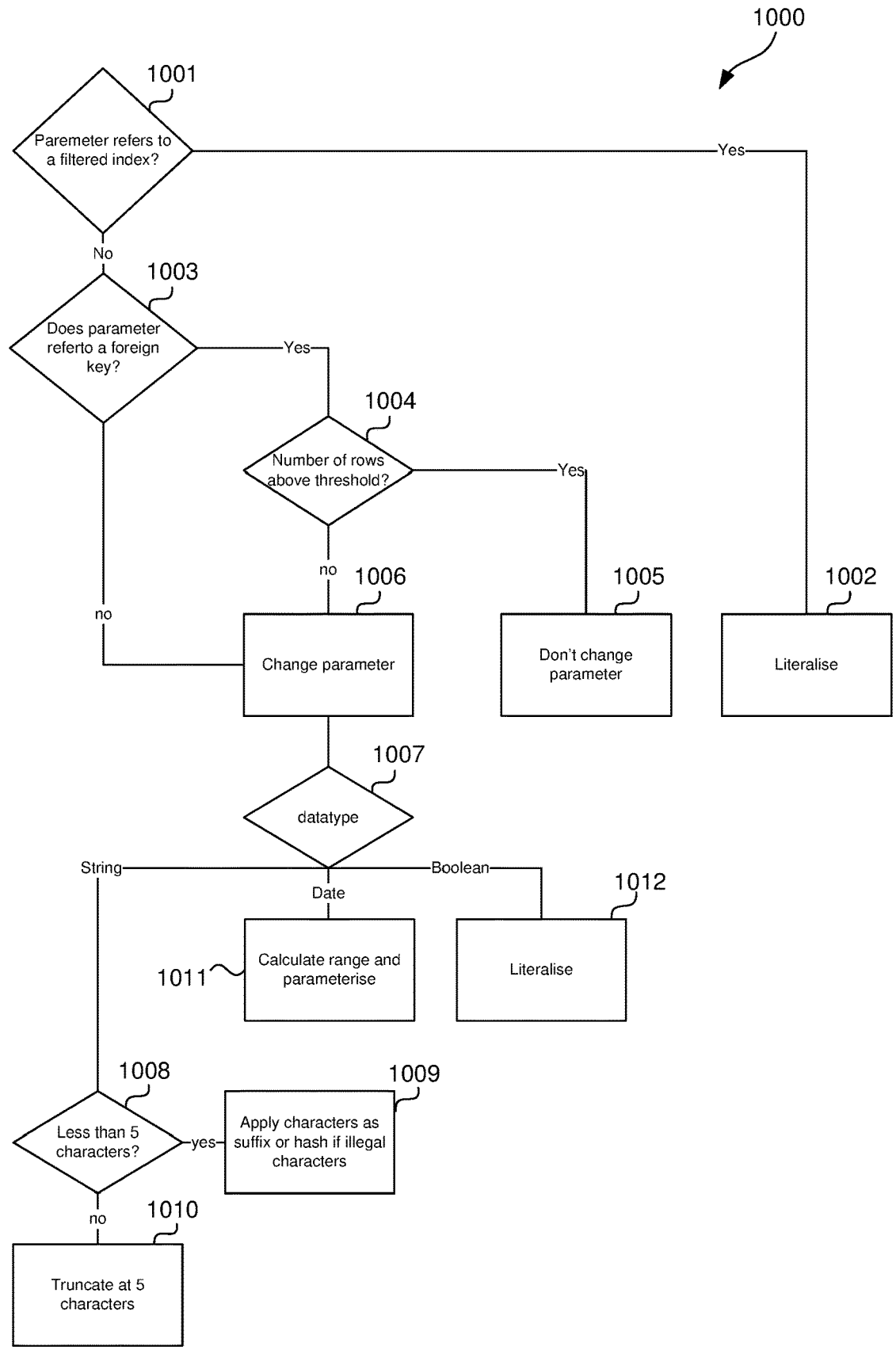

FIG. 10 illustrates a flow-chart for determining a second parameter name based on the parameter value.

Figure 11:
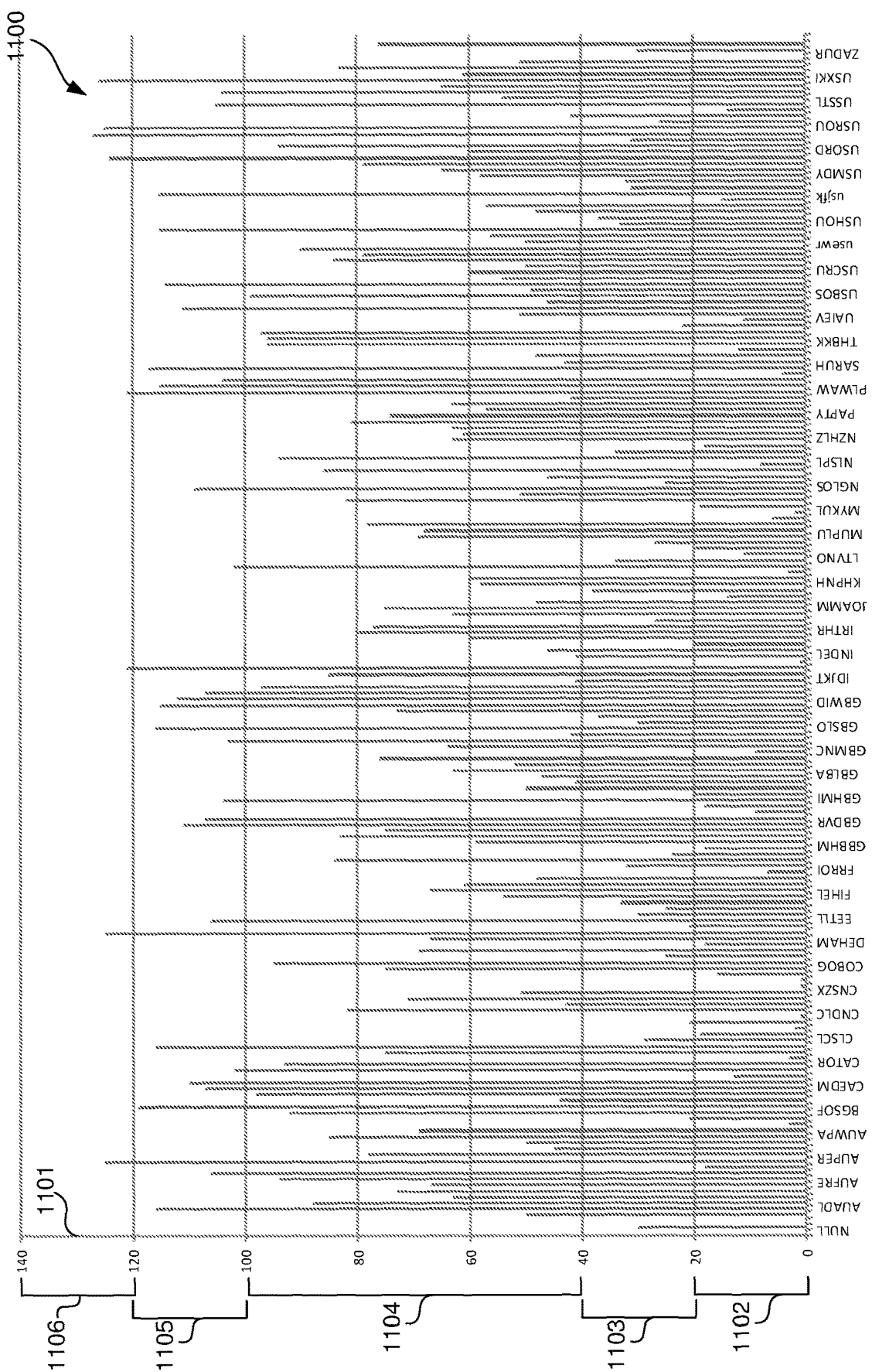

FIG. 11 illustrates a histogram of a database table.

DESCRIPTION OF EMBODIMENTS

As discussed above, the disclosed methods and system for altering a query result in a plan being generated so that instead of searching the entire date database, the plan results in searching for the requested limited time period. In this way a generated plan is generated based upon what is statistically determined to be stored and what is actually being requested, prior the query being presented to the SQL server (in a proxy system between the query and the server). By changing the parameters to something useful, like a limited location or a limited date range, the plan will be re-used since it is likely that a limited location or that limited date range will be used repeatedly.

The disclosed methods and systems are carried out by a computer system. FIG. 7 illustrates a computer system 700 for querying a database. The computer system 700 comprises a processor 701 connected to a program memory 702, a data memory 703, an input port 704 and an output port 705.

Input port 704 is communicatively coupled, such as over the internet, to a client computer 706 operated by user 707. For example, user 707 operates a logistics software program and client computer 706 generates a user interface comprising data fields that are to be populated with logistics data as requested by user 707. Client computer 706 may generate a list of countries as a clickable list and present the list to the user 707. Client computer 706 then receives user input identifying "Mexico", for example, as the country for which the user wishes to see customer data. In response to receiving this user input, client computer 706 selects a parameterised database query string "SELECT*FROM Customers WHERE Country=@countryparam" and sends the query string to computer system 100 together with parameter value "Mexico" for the "@countryparam" parameter.

Output port 705 is communicatively coupled, such as over the internet, to a database server 708, such as Microsoft SQL server, which is, in turn, connected to a database storage 709. Processor 701 modifies the query string as described below and sends the modified query string to database server 708. Database server 708 performs the query according to the query string received from computer system 100. Performing the query comprises selecting or generating an execution plan for the query.

The program memory 702 is a non-transitory computer readable medium, such as a hard drive, a solid state disk or CD-ROM. Software, that is, an executable program stored on program memory 702 causes the processor 701 to perform the method in FIG. 8, that is, processor 701 receives an input query string with a parameter name in it and a parameter value, replaces the parameter name by a string that is based on the parameter value and sends the resulting output query string to a database server. The processor 701 may store the output and/or input query string on data store 703, such as on RAM or a processor register.

The processor 701 may receive data, such as a query string, from data memory 703 as well as from the input port 704. In one example, the processor 701 receives the query string from client computer 706 via input port 704, such as by using a Wi-Fi network according to IEEE 802.11. The Wi-Fi network may be a decentralised ad-hoc network, such that no dedicated management infrastructure, such as a router, is required or a centralised network with a router or access point managing the network.

Although input port 704 and output port 705 are shown as distinct entities, it is to be understood that any kind of data port may be used to receive data, such as a network connection, a memory interface, a pin of the chip package of processor 701, or logical ports, such as IP sockets or parameters of functions stored on program memory 702 and executed by processor 701. These parameters may be stored on data memory 703 and may be handled by-value or by-reference, that is, as a pointer, in the source code.

The processor 701 may receive data through all these interfaces, which includes memory access of volatile memory, such as cache or RAM, or non-volatile memory, such as an optical disk drive, hard disk drive, storage server or cloud storage. The computer system 700 may further be implemented within a cloud computing environment, such as a managed group of interconnected servers hosting a dynamic number of virtual machines.

In one example, computer system 700 operates as a proxy server. This means that the interface 704 to the client computer 706 is identical to the interface that the database server would provide if the client computer 706 was connected to the database server 708 directly. In other words, the client computer 706 is not aware and does not determine that the proxy server 700 is not actually the database server 708. The main difference to the direct connection is the increased performance achieved by the proxy server 700 by modifying the query strings by replacing parameter names based on the value of those parameters. This also means that the input port 704 and output port 705 may be bi-directional full-duplex input/output communication ports. That is, input port 704 and output port 705 also transport database rows that result from querying the database back to the client computer 706, such as using SQL protocols. Proxy server 700 may process the data and convert the individual rows into JSON or XML format, for example. Further, both ports 704 and 705 may be represented by a single physical LAN interface to send and receive data to and from the client computer 706 and the database server 708.

It is to be understood that any receiving step may be preceded by the processor 701 determining or computing the data that is later received. For example, the processor 701 determines a query string and stores the query string in data memory 703, such as RAM or a processor register. The processor 701 then requests the data from the data memory 703, such as by providing a read signal together with a memory address. The data memory 703 provides the data as a voltage signal on a physical bit line and the processor 701 receives the query string via a memory interface. For example, the client computer 706 sends an identifier of a query string instead of the query string itself and processor 701 retrieves the query string from data memory 703 using the identifier as a key. It is to be understood that throughout this disclosure unless stated otherwise, strings, nodes, edges, graphs, solutions, variables, parameters, execution plans and the like refer to data structures, which are physically stored on data memory 703 or on database management system 708 or processed by processor 701.

FIG. 8 illustrates a method 800 as performed by processor 701 for querying a database. FIG. 9 illustrates example data 900 of method 800 where the reference numerals relate to each other, such that reference numeral 801 relates to 901, 802 relates to 902 and so on. FIG. 8 is to be understood as a blueprint for the software program and may be implemented step-by-step, such that each step in FIG. 8 is represented by a function in a programming language, such as C++ or Java. The resulting source code is then compiled and stored as computer executable instructions on program memory 702.

Method 800 commences by processor 701 receiving 801 an input query string 901. The input query string 901 comprises a filter clause 906 with a field name 907, an operator 910 and a first field value 908, the first field value 908 being indicative of a first parameter name 909. In this example, the first field value 908 is the first parameter name 909 prefixed by an '@' symbol.

Processor 701 also receives 802 a parameter value 902 for the first parameter name, which may occur before, after or concurrently with the receiving step 801 of the input query string 901. Processor 701 then determines 803 a second parameter name 903 based on the parameter value 902 and different to the first parameter name 909. In this example, processor 701 uses the first three letters ('mex') of the parameter value ("Mexico"), which is a string in this case, and uses those letters as a suffix to the first parameter name 909. While examples herein relate to suffixes, it is noted that prefixes and any other modifications to the parameter name based on the parameter value can equally be used. The way how processor 701 determines the second parameter name may depend on the data type of the field identified by the field name 907 and other factors as will be explained in more detail below.

Next, processor 701 determines 804 an output query string 904 based on the input query string 901, the output query string 901 comprising the filter clause 911 with the field name 907 and a second field value 912. The second field value 912 of the output query string 904 is based on the second parameter name 903. In this case, processor 701 prefixes the second parameter name 903 with the '@' symbol and places the result behind the operator' 910 instead of the first field value 908. In other words, processor 701 replaces the first parameter name 909 with the second parameter name 903 that is based on the parameter value.

Finally, processor 701 sends 805 the output query string 905 to the database management system 708. This causes the database management system 708 to execute a database query using an execution plan based on the second parameter name 903 in the output query string 904.

FIG. 10 illustrates a flow-chart 1000 that shows the step of determining 803 a second parameter name based on the parameter value in more detail. Flow-chart 1000 may be stored as multiple nested if-then-else blocks in program code on program memory 702. It is noted that decisions in flow-chart 1000 are arranged in a particular order, it is to be understood that other ordering of the decisions may equally be applicable.

Processor 701 first determines 1001 whether the parameter refers to a filtered index. For this decision, processor 1001 may request metadata from the database server 708 including a list of filtered indexes. For example, processor 1001 accesses the SQL table object "sys.indexes" where the "has filter" column has a value of '1'. If the column name is on the list, that is, the parameter refers to a filter predicate, processor 701 literalises 1002 the parameter, which means processor 701 replaces the parameter name by the parameter value. This causes the database server 708 to generate a new execution plan for each different value of the parameter, which increases the number of plans significantly but may be practical in cases where the number of different values for the filter predicate, and therefore the number of execution plans, are limited.

Figures 1, 2:
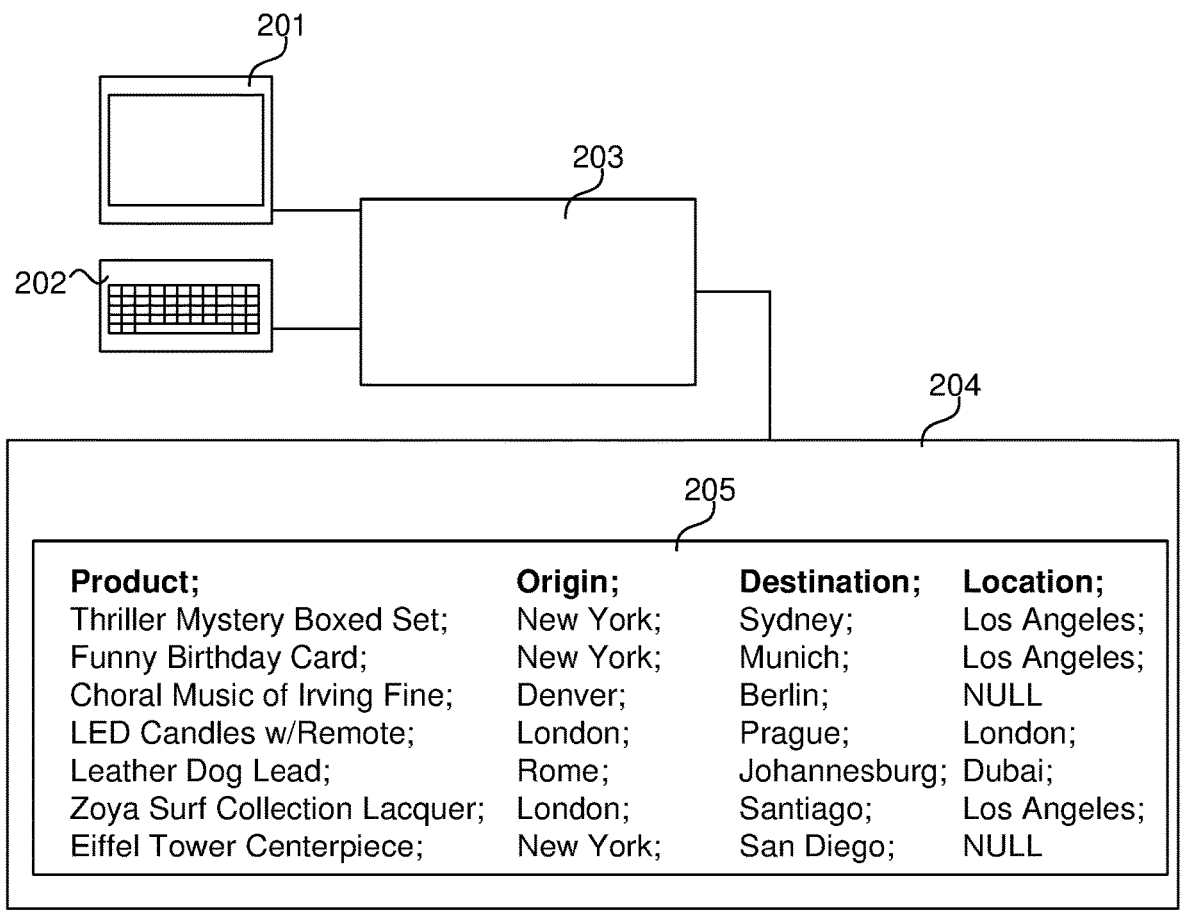
FIG. 1 illustrates a pen and paper approach for managing logistics data.
FIG. 2 illustrates a computerised data management system.
Figure 5A:
FIG. 5a illustrates another example for a clustered index.
Figure 5B:
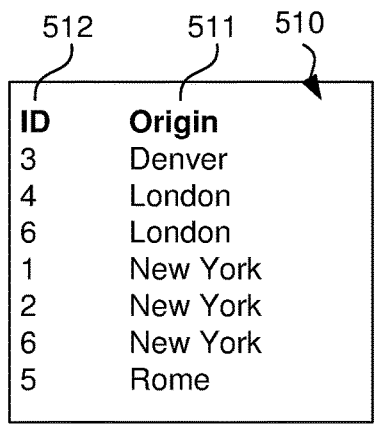
FIG. 5b illustrates an non-clustered index.
Figure 6A:
FIGS. 6a and 6b illustrate an example of a first table and a second table, respectively.
Figure 6B:

If the parameter does not relate to a filter predicate, processor 701 determines 1003 whether the parameter refers to a foreign key. Processor 701 may first identify the field name in the query string. In the example of FIGS. 6*a* and 6*b* and the query "SELECT*FROM Shipments WHERE Origin=@% origin_param" processor 701 identifies the word 'Origin' before the operator, that is before '=', as the field name. Processor 701 then retries DBMS metadata by running the sys.foreign_keys command. Processor 701 can then compare the field name to the foreign keys in the metadata and if there is a match, the parameter refers to a foreign key. In this case, the metadata shows that the 'Origin' field in first table 600 in FIG. 6*a* is a foreign key to the second table 610 in FIG. 6*b*.

If processor 701 determines that the parameter name refers to a foreign key, processor 701 determines 1004 the number of rows of the table to which the foreign key refers. In the above example, processor 701 determines the number of rows in the second table 610. Processor 701 may perform a query including a COUNT statement to the database or request metadata from the database server 708 containing the number of rows in each table. In applications where the number of rows does not change significantly, processor 701 may store that value on data store 703 for further use with other queries.

Processor 701 then determines whether the number of rows associated with the foreign key, that is, the number of rows in the parent table, exceeds 1004 a threshold, such more than 2,000 or more than 5,000 rows. If the number of rows exceeds the threshold, processor 701 does not change the parameter name 1005. The rational for that decision is that for a large number of rows, changing the parameter may lead to a large number of execution plans and cause plan bloat. Instead, a single plan is used by the database server 708 for querying for any one of the rows in a table that may have millions of rows.

If the number of rows in the table of the foreign key is below the threshold (step 1004), or if the parameter does not refer to a foreign key at all (step 1003), processor 701 changes 1006 the parameter name. In one example, processor 701 literalises the foreign key parameter which means that the new parameter name is unique for each row in the foreign key table. For example, the table in FIG. 6*b* has only 13 entries without duplicate City names, which means literalising the parameter leads unique names for each row and results in only 13 execution plans. Processor 701 may suffix the parameter name by the parameter value, such as from "cityname_param" to "cityname_param_london" or only use the first three letters to determine "cityname_param_lon".

In order to decide on how to change the parameter name, processor 701 determines the datatype 1007. Again, processor 701 can request metadata including the datatypes of columns/fields of the database. For example, processor 701 may execute the command "SELECT TABLE_NAME, COLUMN_NAME, DATA_TYPE FROM Database.IN-FORMATION_SCHEMA.COLUMNS WHERE TABLE_NAME='Shipments' AND COLUMN_NAME=cityname'. If the datatype is STRING, processor 701 determines 1008 whether the parameter value has less than a threshold number of characters, such as less than 5 characters or less than 3 characters. If the parameter name does have less than the threshold number of characters, processor 701 suffixes 1009 the parameter name with the parameter value. In doing so, processor 701 may check for any illegal characters that are not used in parameter names, such as apostrophes or slashes. If processor 701 detects an illegal character, processor 701 calculates a hash value for the parameter value and uses the hash value as the suffix or may even use the hash value as the parameter name.

Returning back to step 1008, if the parameter value has not less than the threshold number of characters, processor 701 truncates 1010 the parameter value to obtain a suffix with the length of the threshold number of parameters. In another example, processor 701 determines the new parameter name based on a histogram that processor 701 can obtain from database server 708 by running a "DBCC SHOW_STATISTICS ("Shipments.cityname", AK_cityname_rowguid) WITH HISTOGRAM" command for the field name that is provided in the filter clause. In other words, the histogram provides frequencies of values in a given column. The histogram data may comprise a list of 200 elements, for example of the format RANGE_HI_KEY|RANGE_ROWS|EQ_ROWS|DISTINCT_RANGE_ROWS|AVG_RANGE_ROWS and two example entries are:

| USBOS | 99 | 72 | 40 | 2.475 |
|---|---|---|---|---|
| USBUF | 49 | 19 | 22 | 2.227273 |

The above example relates to an airport column in a Shipments table where the first letters is a country code and the last letters are the airport code. This means the second line relates to all airports that are alphabetically between Gen. Edward Lawrence Logan International Airport (Boston) and Buffalo Niagara International Airport prefixed by 'US'.

FIG. 11 illustrates the histogram graphically using the RANGE ROWS value as the y-axis 1101. Processor 701 now determines the parameter name such that parameter values that have a similar value in the histogram also have the same parameter name. This means, queries for parameter values for similar histogram values will be executed using the same execution plan. More particularly, processor 701 may determine a range on the y-axis in the histogram for the received parameter value. In the example of FIG. 11, five ranges 1102 to 1106 are defined as multiple predefined conditions on the histogram steps. When processor 701 receives a parameter value, such as "USBTV" for Burlington International Airport, processor 701 determines that this range relates to y-value of 49 in histogram 1100. As a result, this parameter value falls within range 1104. In other words, processor 701 determines that the parameter value meets the predefined condition of being within range 1104. Each range 1102 to 1106 may be assigned to one predefined parameter name, such as "airport_param_1" for range 1102, "airport_param_2" for range 1103, "airport_param_3" for range 1104, "airport_param_4" for range 1105 and "airport_param_5" for range 1106. So in this example, the new parameter name is "airport_param_3". In another example, suffixes for the parameter name are "_large", "_medium" and "_small" in an example of three ranges. The aim is that for each predefined condition, that is, for each range, the parameter name is identical for all parameter values in histogram steps that satisfy this condition, that is, lie within the range.

This histogram based approach may be particularly useful in cases where the number of possible parameter values is greater than the number of histogram steps provided by the database server 708 (which is currently 200 for Microsoft SQL server). As a consequence, there is one unique parameter name for each histogram step. It may further be useful in cases where parameter values that are alphabetically close also share similar frequency. For example, most airports in the US may have a similar characteristic and therefore, when the airport parameter name starts with the country code, airports within the same country are likely located in the same histogram bracket. Further, the histogram approach can reduces the number of execution plans in cases where multiple fields with multiple parameter names are used. If three fields each have 100 different values, such as 100 different truncated three-letter values, in combination there are 100^3=1,000,000 different combinations, that is 1,000,000 different execution plans that are created and stored. By using only five histogram ranges, that number is reduced to 5^3=125 execution plans.

Returning back to step 1007 of determining the datatype of the parameter value, if the data type is DATE (YYYY-MM-DD), processor 701 determines a date range by using a comparison between the parameter value and the present day. For example, many users query logistics data that occurred in the last week. The filter clause may be "WHERE order date BETWEEN CURDATE( ) AND @date_param" with example values of '2000-01-01' for CURDATE( ) and a parameter value of '2000-01-08'. Processor 701 analyses this filter clause and extracts a time interval of seven days. Accordingly, processor 701 suffixes '7' or 'seven' or 'week' to the parameter name 'date_param'. In fact, the suffix can be arbitrary as long as processor 701 keeps a record of the relationship between the suffix and the period. This way, processor 701 would determine the same parameter name for all queries that query the last week or any other period of one week. As a result, database server 708 creates an execution plan once for all these queries and re-uses that execution plan for all future queries for a period of one week. Similarly, processor 701 may determine a parameter name for all queries that query the last month. The number of different parameter names may include but not limited to:

date_param_1week: 1 week period
date_param_2week: 2 week period
date_param_3week: 3 week period
date_param_1month: 1 month period
date_param_2month: 2 month period
date_param_3month: 3 month period (quarter)
date_param_6month: 6 month period (half-year)
date_param_1year: 1 year period For all other queries that do not fall within these date ranges, processor 701 may leave the parameter name unchanged. As a result, database server 708 executes these less common queries by the same execution plan created for the original parameter name "date_param". Other policies on parameter names and time periods may also be used. For example, the time periods may be defined in terms of hours, minutes or seconds instead of days for more time-critical operations.

Returning again back to the datatype selection 1007, when processor 701 determines that the datatype is Boolean, processor 701 may parameterise 1012 for each value. In other words, processor 701 determines one of two different possibilities for the parameter name. For example, a field name may be "paid" and a Boolean True value indicates that the shipment has been paid in full. When processor 701 receives a query with a filter clause of "WHERE paid=@paid param" and the parameter value is "True", the processor 701 determines the new parameter name as "paid param true". Vice versa, processor 701 determines parameter name "paid param false" in case the parameter value is false. As mentioned above, the two parameter names can be arbitrary as long as they are different and processor 701 records the relationship. For example, the parameter name for the True value may be "51vq7Zm4h5" and the parameter name for the False value may be "KKG9Y4bUQ4" (these are completely random strings). It is important that subsequent queries are mapped according to the same logic. That is, processor 701 does not randomise the parameter name every time but only once and then re-uses that value for subsequent queries. This also applies to other examples including strings and data ranges: Processor 701 determines the same parameter name for input queries where the parameter value satisfies the same test. While the actual name of the parameter is essentially irrelevant for the database server 708, debugging and monitoring may be facilitated by using the parameter value or part of the parameter value as a suffix.

This way, database server 708 creates and uses two different execution plans depending on the value of the paid_param parameter, which results in an increased performance. This performance is particularly significant when there is a large difference between the number of paid shipments to the number of unpaid shipments. That is, the advantage is greatest for heavily skewed distributions.

Figure 12:
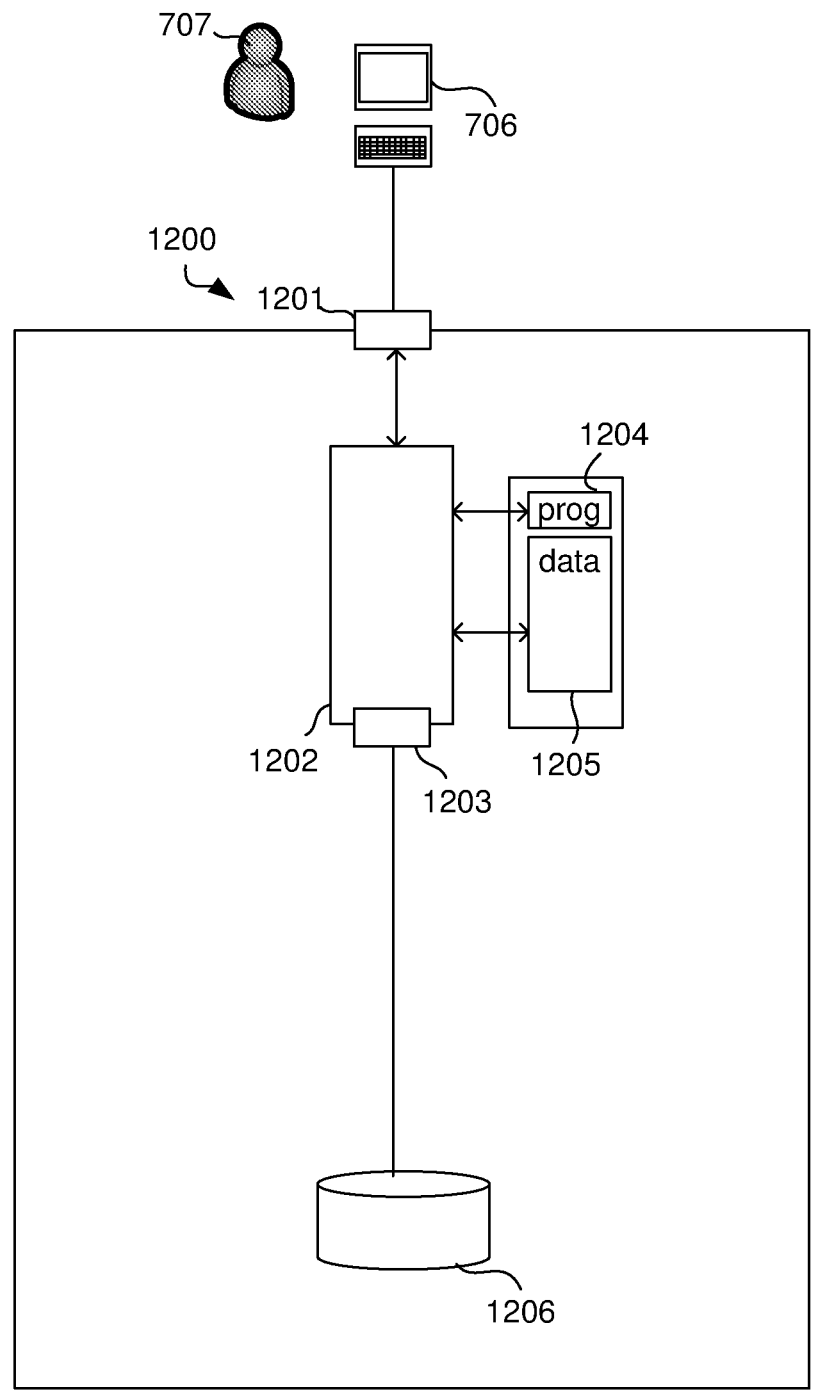

FIG. 12 illustrates a database management system 1200. The database management system 1200 comprises an input 1201, a processor 1202 and a database engine 1203. Input 1201 is connected to receive an input query string from client computer 706. The input query string comprises a filter clause with a field name and a first field value. The first field value is indicative of a first parameter name. Input 1201 further receives a parameter value for the first parameter name.

Processor 1202 is connected to program memory 1204 and data memory 1205 and executes program code stored on program memory 1204. In that sense, processor 1202 determines a second parameter name based on the parameter value and different to the first parameter name. Processor 1202 further determines an output query string based on the input query string. The output query string comprises the filter clause with the field name and a second field value. The second field value of the output query string is based on the second parameter name.

Database engine 1203 may be a separate process running on processor 1202 or may be executed by a different processor core, a different processor chip, a different virtual machine hosted by the same computer hardware or a different dedicated computer system. Database engine 1203 executes a database query on data store 1206 using an execution plan based on the second parameter name in the output query string. Processor 1202 may follow the same steps as described with reference to FIGS. 8, 9, 10 and 11. As described above, since the database engine uses an execution plan based on the second parameter name, the use of execution plans can be controlled by dynamically determining the second parameter name based on the parameter value. This opens the possibility of optimisation of plan usage based on the parameter value, which is not possible with existing systems.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for querying a database, the method comprising:
   receiving, at a database proxy server, an input query string from a client computer, the input query string comprising a filter clause with a field name and a first field value, the first field value comprising a first parameter name;
   receiving, at the database proxy server, a parameter value from the client computer for the first parameter name;
   creating, by the database proxy server, a second parameter name based on the parameter value and different to the first parameter name,
   the second parameter name comprising the first parameter name and at least part of the parameter value;
   modifying the input query string, by the database proxy server, by creating an output query string based on the input query string and by replacing the first parameter name with the second parameter name;
   sending the output query string from the database proxy server to a database management system, wherein the database proxy server is between the client computer and the database management system;
   executing the output query string, as a database query, by the database management system, using one of a plurality of execution plans, wherein the plurality of execution plans are additionally generated for different second parameter names, and wherein the used execution plan is used as an additional execution plan based on the second parameter name in the output query string; and
   re-using the second parameter name to use additional execution plan for subsequent queries executed in the database management system.

2. The method of claim 1, wherein the second parameter name comprises the first parameter name and a suffix or prefix of the parameter value and determining the second parameter name comprises determining the suffix or prefix of the parameter value.

3. The method of claim 1, wherein
   the field name refers to a foreign key, and
   creating the second parameter name comprises determining the second parameter name based on a number of rows in a table associated with the foreign key.

4. The method of claim 3, further comprising upon determining that the number of rows in the table associated with the foreign key is below a threshold, creating the second parameter name such that the second parameter name is unique for each row in the table associated with the foreign key.

5. The method of claim 4, wherein
   the parameter value for the first parameter name comprises a string, and
   creating the second parameter name such that the second parameter name is unique for each row in the table associated with the foreign key comprises appending a suffix to the first parameter name based on the parameter value for the first parameter name.

6. The method of claim 5, wherein the suffix comprises the first two or more letters of the parameter value.

7. The method of claim 1, wherein
   the method further comprises receiving histogram data for the field name, and
   creating the second parameter name comprises determining the second parameter name based on the histogram data.

8. The method of claim 7, wherein
   creating the second parameter name based on the histogram data comprises creating the second parameter name such that the second parameter name is unique for each of a plurality of histogram steps.

9. The method of claim 7, wherein creating the second parameter name based on the histogram data comprises creating the second parameter name based on multiple predefined conditions on a plurality of histogram steps, such that for each predefined condition the second parameter name is identical for all parameter values in histogram steps that satisfy that condition.

10. The method of claim 9, further comprising creating another second parameter name using a predefined parameter name as the another second parameter name upon determining that the parameter value is in a histogram step that has a frequency value below a predetermined threshold.

11. The method of claim 1, wherein
    the parameter value is related to a date and/or time,
    the method further comprises determining a length of a time period based on the date and/or time, and
    creating the second parameter name comprises determining the second parameter name based on the length of the period of time.

12. The method of claim 11, wherein creating the second parameter name comprises creating the second parameter name based on multiple predefined conditions on the length of the period of time, such that for each predefined condition the second parameter name is identical for all parameter values with a length of the period of time that satisfy that condition.

13. The method of claim 1, wherein creating the second parameter name comprises determining whether the field name relates to a filtered index and upon determining that the field name relates to a filtered index, using the parameter value as the second parameter name.

14. The method of claim 1 wherein the input query string is of the form SELECT <fieldnames>FROM <table names>WHERE <fieldname> <operator>@<firstparametername>;
    where <firstparametername> is the first parameter name, and <secondparametername> is the second parameter name, and wherein the output query string is of the form SELECT <fieldnames>FROM <table names>WHERE <fieldname> <operator>@<secondparametername>;
    and wherein terms within < > brackets are replaced by terms used in the actual implementation and immutable during the performance of the method.

15. A database proxy system for querying a database, the computer system comprising:
    an input port
      to receive an input query string, the input query string comprising a filter clause with a field name and a first field value, the first field value comprising a first parameter name, and
      to receive a parameter value for the first parameter name;
    a processor configured to:
      create a second parameter name based on the parameter value and different to the first parameter name, the second parameter name comprising the first parameter name and at least part of the parameter value, and modify the input query string by creating an output query string based on the input query string, and by replace the first parameter name with the second parameter name;

an output port to send the output query string to a database management system;

wherein the processor is further configured to execute the output query string, as a database query, using one of a plurality of execution plans, wherein the plurality of execution plans are additionally generated for different second parameter names, and wherein the used execution plan is used as an additional execution plan based on the second parameter name in the output query string, and re-use the second parameter name to use additional execution plan for subsequent queries executed in the database management system.

16. The database proxy system of claim 15, wherein:

the input port is an input connected to a client computer to receive from the client computer the input query string, and the output port is connected to the database management system.

17. A database management system, the database management system comprising:

an input connected to receive an input query string, the input query string comprising a filter clause with a field name and a first field value, the first field value comprising a first parameter name, and to receive a parameter value for the first parameter name;

a processor configured to create a second parameter name based on the parameter value and different to the first parameter name, the second parameter name comprising the first parameter name and at least part of the parameter value, and modify the input query string by creating an output query string based on the input query string, and by replace the first parameter name with the second parameter name;

a database engine to execute the output query string, as a database query, using one of a plurality of execution plans, wherein the plurality of execution plans are additionally generated for different second parameter names, and wherein the used execution plan is used as an additional execution plan based on the second parameter name in the output query string, and wherein the processor is further configured to re-use the second parameter name to use additional execution plan for subsequent queries executed in the database management system.

* * * * *